US009780393B2

(12) United States Patent
Bowers et al.

(10) Patent No.: US 9,780,393 B2
(45) Date of Patent: Oct. 3, 2017

(54) COOLING SYSTEM AND METHOD FOR USE WITH A FUEL CELL

(71) Applicants: Brian J. Bowers, Cambridge, MA (US); Steven Fiore, Medford, MA (US); Ware Fuller, Sudbury, MA (US); Greg Hickey, Boston, MA (US); Changsik Kim, Lexington, MA (US)

(72) Inventors: Brian J. Bowers, Cambridge, MA (US); Steven Fiore, Medford, MA (US); Ware Fuller, Sudbury, MA (US); Greg Hickey, Boston, MA (US); Changsik Kim, Lexington, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 660 days.

(21) Appl. No.: 13/795,115

(22) Filed: Mar. 12, 2013

(65) Prior Publication Data

US 2013/0236804 A1    Sep. 12, 2013

Related U.S. Application Data

(60) Provisional application No. 61/609,531, filed on Mar. 12, 2012.

(51) Int. Cl.
*H01M 8/04029*    (2016.01)
*H01M 8/04828*    (2016.01)
(Continued)

(52) U.S. Cl.
CPC ..... *H01M 8/04029* (2013.01); *H01M 8/0432* (2013.01); *H01M 8/04059* (2013.01);
(Continued)

(58) Field of Classification Search
CPC ................ H01M 8/04; H01M 8/04029
(Continued)

(56) References Cited

U.S. PATENT DOCUMENTS 4,362,789 A    12/1982  Dighe
6,277,509 B1    8/2001  Wheeler
(Continued)

FOREIGN PATENT DOCUMENTS

DE        100 20 055 A1    10/2001
JP        2004-039527 A    2/2004
(Continued)

OTHER PUBLICATIONS

Partial International Search Report from International Application No. PCT/US2013/030266 mailed Jul. 12, 2013.
(Continued)

*Primary Examiner* — James Lee
(74) *Attorney, Agent, or Firm* — Finnegan, Henderson, Farabow, Garrett & Dunner LLP (57) ABSTRACT

A cooling system is provided for use with a fuel cell. The cooling system comprises a first heat exchanger fluidly connected to an outlet passage of the fuel cell. The first heat exchanger can be configured to condense at least a portion of a fluid passing through the outlet passage of the fuel cell into liquid water. The cooling system can also comprise a second heat exchanger fluidly connected to an outlet passage of the first heat exchanger and an inlet passage of the fuel cell. The second heat exchanger can be configured to cool a fluid passing into the inlet passage of the fuel cell. In addition, the outlet passage of the fuel cell and the inlet passage of the fuel cell can be fluidly connected to a cathode of the fuel cell, and the inlet passage of the fuel cell can be configured to supply water to the cathode.

10 Claims, 9 Drawing Sheets

(51) Int. Cl.
*H01M 8/04007* (2016.01)
*H01M 8/04119* (2016.01)
*H01M 8/0432* (2016.01)
*H01M 8/04701* (2016.01)
*H01M 8/04291* (2016.01)
*F28D 21/00* (2006.01)

(52) U.S. Cl.
CPC ... *H01M 8/04134* (2013.01); *H01M 8/04164* (2013.01); *H01M 8/04291* (2013.01); *H01M 8/04716* (2013.01); *H01M 8/04723* (2013.01); *H01M 8/04843* (2013.01); *F28D 2021/0043* (2013.01); *H01M 8/04074* (2013.01)

(58) Field of Classification Search
USPC .................................................. 429/400–535
See application file for complete search history.

(56) References Cited

U.S. PATENT DOCUMENTS

| | | | |
|---|---|---|---|
| 2002/0178920 A1 | 12/2002 | Margiott et al. | |
| 2003/0148155 A1* | 8/2003 | Matthews | H01M 8/04029 429/430 |
| 2004/0191585 A1* | 9/2004 | Morita | H01M 8/04007 429/413 |
| 2005/0255351 A1* | 11/2005 | Fukuda | 429/22 |
| 2006/0210853 A1* | 9/2006 | Fukuda | H01M 8/04097 429/415 |
| 2006/0257699 A1 | 11/2006 | Hood et al. | |
| 2011/0033763 A1* | 2/2011 | Adcock | H01M 8/04007 429/429 |
| 2012/0070751 A1* | 3/2012 | Yang et al. | 429/410 |

FOREIGN PATENT DOCUMENTS

| | | | |
|---|---|---|---|
| JP | 2005-183117 | | 7/2005 |
| JP | 2006-302594 | | 11/2006 |
| JP | 2007-273302 | A | 10/2007 |
| JP | 2007-280755 | A | 10/2007 |
| JP | 2008-130484 | A | 6/2008 |
| JP | 2009-224179 | A | 1/2009 |
| JP | 2009-138253 | A | 6/2009 |
| WO | WO 2004/006369 | A | 1/2004 |
| WO | WO 2010/137774 | * | 12/2010 .............. H01M 8/04 |

OTHER PUBLICATIONS

International Search Report and Written Opinion from International Application No. PCT/US2013/030266 mailed Dec. 10, 2013.
Notification of Reasons for Rejection issued in Japanese Application No. 2015-500496 on Dec. 14, 2016.
Extended European Search Report issued in European Application No. 17172279.6 on Jul. 14, 2017, 9 pgs.
Notification of Reasons for Rejection issued in Japanese Patent Application No. 2015-500496, dated Jun. 26, 2017, 6 pages.

* cited by examiner

COOLING SYSTEM AND METHOD FOR USE WITH A FUEL CELL

This application claims the benefit of U.S. Provisional Application No. 61/609,531, filed Mar. 12, 2012, which is incorporated herein by reference.

TECHNICAL FIELD

This disclosure is generally directed to cooling systems for use with a fuel cell.

BACKGROUND

Some types of fuel cell can include an anode, a cathode, and a porous membrane located between the anode and the cathode. The membrane is configured to permit a flow of select ionic species from the cathode to the anode. In response to this movement of ions across the membrane, electrons flow from the anode to the cathode.

A fuel cell operates by reacting hydrogen at the anode and oxygen at the cathode. Oxygen can be sourced from atmospheric air and pure hydrogen is usually supplied to the anode. The reactions occurring at the cathode and anode may generate considerable heat. To dissipate this heat, various cooling systems have been developed. One type of cooling system uses cathode water injection (CWI), where cooling water is supplied to the cathode of a fuel cell and allowed to mix with one or more gases supplied to the cathode.

In addition to maintaining the fuel cell within a limited range of operating temperatures, a cooling system should also operate without the need to add or remove water from the cooling system, A "water neutral" cooling system can conserve water or save operator time spent adding or removing water.

Some traditional cooling systems are not able to efficiently provide sufficient cooling and achieve a suitable water balance under all operating conditions because a single heat exchanger is typically used to both condense and cool water. Combining condensing and cooling functions into a single device is problematic because of the differing requirements needed to maintain adequate water balance and cooling. For example, to remove excess water from the cooling system, a heat exchanger's fan speed is usually reduced to create a hotter exhaust gas that can transport more water out of the cooling system. But reducing fan speed increases water temperature, which may result in a fuel cell temperature that is too high. As such, it is often difficult to remove water and prevent fuel cell overheating using traditional cooling systems.

The present disclosure is directed to overcoming one or more of the problems or disadvantages of the prior art cooling systems.

SUMMARY

One aspect of the present disclosure is directed to a cooling system for use with a fuel cell. The cooling system comprises a first heat exchanger fluidly connected to an outlet passage of the fuel cell. The first heat exchanger can condense at least a portion of a fluid passing through the outlet passage of the fuel cell into liquid water. The cooling system can also comprise a second heat exchanger fluidly connected to an outlet passage of the first heat exchanger and an inlet passage of the fuel cell. The second heat exchanger can be configured to cool a fluid passing into the inlet passage of the fuel cell. In addition, the outlet passage of the fuel cell and the inlet passage of the fuel cell can be fluidly connected to a cathode of the fuel cell, and the inlet passage of the fuel cell can be configured to supply water to the cathode.

Another aspect of the present disclosure is directed to a power system. The power system can comprise a fuel cell having a cathode fluidly connected to an outlet passage and an inlet passage, wherein the inlet passage can be configured to supply at least partially recirculated water to the cathode. The power system can also comprise a first heat exchanger fluidly connected to the outlet passage of the fuel cell, wherein the first heat exchanger can be configured to convert at least a portion of a fluid passing through the outlet passage of the fuel cell into water. In addition, the power system can comprise a second heat exchanger fluidly connected to an outlet passage of the first heat exchanger and the inlet passage of the fuel cell, wherein the second heat exchanger can be configured to cool a fluid passing into the inlet passage of the fuel cell.

Another aspect of the present disclosure is directed to a method of cooling a fuel cell. The method can comprise supplying hydrogen to an anode of the fuel cell and supplying air and water to a cathode of the fuel cell, and outputting a fluid from the fuel cell, wherein at least a portion of the fluid comprises a first fluid. The method can also comprise supplying the first fluid to a first heat exchanger and condensing at least a portion of the first fluid into water using the first heat exchanger. A second heat exchanger may be supplied with at least one of the fluid output from the fuel cell and the water condensed by the first heat exchanger. Further, the method can comprise cooling a fluid flowing through the second heat exchanger, and supplying the cooled fluid to the fuel cell.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the systems, devices, and methods, as claimed.

BRIEF DESCRIPTION OF THE DRAWINGS

The accompanying drawings, which are incorporated in and constitute a part of this specification, illustrate several embodiments of the present disclosure and together with the description, serve to explain the principles of the present disclosure.

DESCRIPTION OF THE EMBODIMENTS

Reference will now be made in detail to the exemplary embodiments of the present disclosure, examples of which are illustrated in the accompanying drawings. Wherever possible, the same reference numbers will be used throughout the drawings to refer to the same or like parts.

Figure 1:
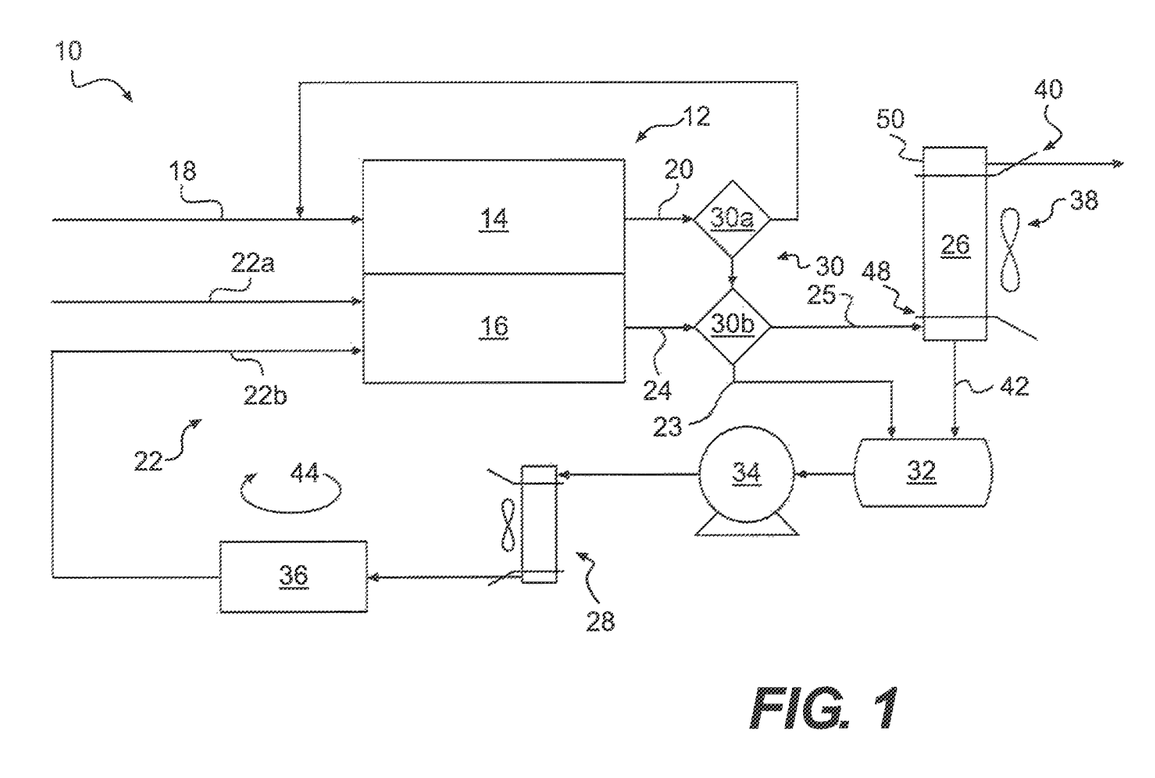
FIG. 1 provides a schematic representation of a cooling system, according to an exemplary disclosed embodiment that comprises a recirculation loop.

FIG. 1 provides a schematic representation of a cooling system 10 of the present disclosure for use with a fuel cell 12. In some embodiments, fuel cell 12 can comprise a cathode water injection (CWI) type of fuel cell, whereby cooling water can be supplied to a cathode 16. In other embodiments, fuel cell 12 can comprise another type of fuel cell.

Fuel cell 12 can comprise an anode 14 fluidly connected to an anode inlet passage 18 and an anode outlet passage 20. Anode inlet passage 18 can be configured to supply hydrogen to anode 14. Outlet passage 20 may be fluidly connected to inlet passage 18 to at least partially recirculate hydrogen through anode 14.

Cathode 16 can be fluidly connected to a cathode inlet passage 22 and a cathode outlet passage 24. Cathode inlet passage 22 can comprise a passage 22a configured to supply air to cathode 16 and a passage 22b configured to supply water to cathode 16. Outlet passage 24 may be fluidly connected to inlet passage 22 to at least partially recirculate water through cathode 16. One of ordinary skill will recognize that fuel cell 12 can be supplied with recirculated or fresh sources of hydrogen, air, and water using various configurations of one or more passages.

Cooling system 10 can comprise a first heat exchanger 26 and a second heat exchanger 28. Heat exchangers 26 and 28 can be configured to condense, separate, trap, or cool water supplied to them in gas, vapor, or liquid form. Heat exchangers 26 and 28 may also be fluidly connected to one or more passages of cooling system 10. For example, first heat exchanger 26 may be fluidly connected to outlet passage 24 of fuel cell 12 and second heat exchanger 28 may be fluidly connected to inlet passage 22b of fuel cell 12.

Cooling system 10 can also comprise other devices, such as, a water separator 30, a storage device 32, a pump 34, or a filter 36. Water separator 30 can be configured to at least partially separate water from a flow of fluid entering water separator 30. Storage device 32 can be configured to store water, and may comprise a tank, a large-diameter passage, or an expandable reservoir. Pump 34 can be configured to move a fluid through a passage. Filter 36 can be configured to at least partially separate particulate matter, ions, or other unwanted components from a fluid. Cooling system 10 can also comprise one or more valves (not shown) or other fluidic devices.

The embodiments shown and described herein are exemplary, and other configurations are possible based on the present disclosure. For example, one or more of the devices described herein may not be required or may be arranged in various configurations throughout cooling system 10. It is also contemplated that one or more functions of these devices may be incorporated into cooling system 10 using these or other devices.

Figure 2:
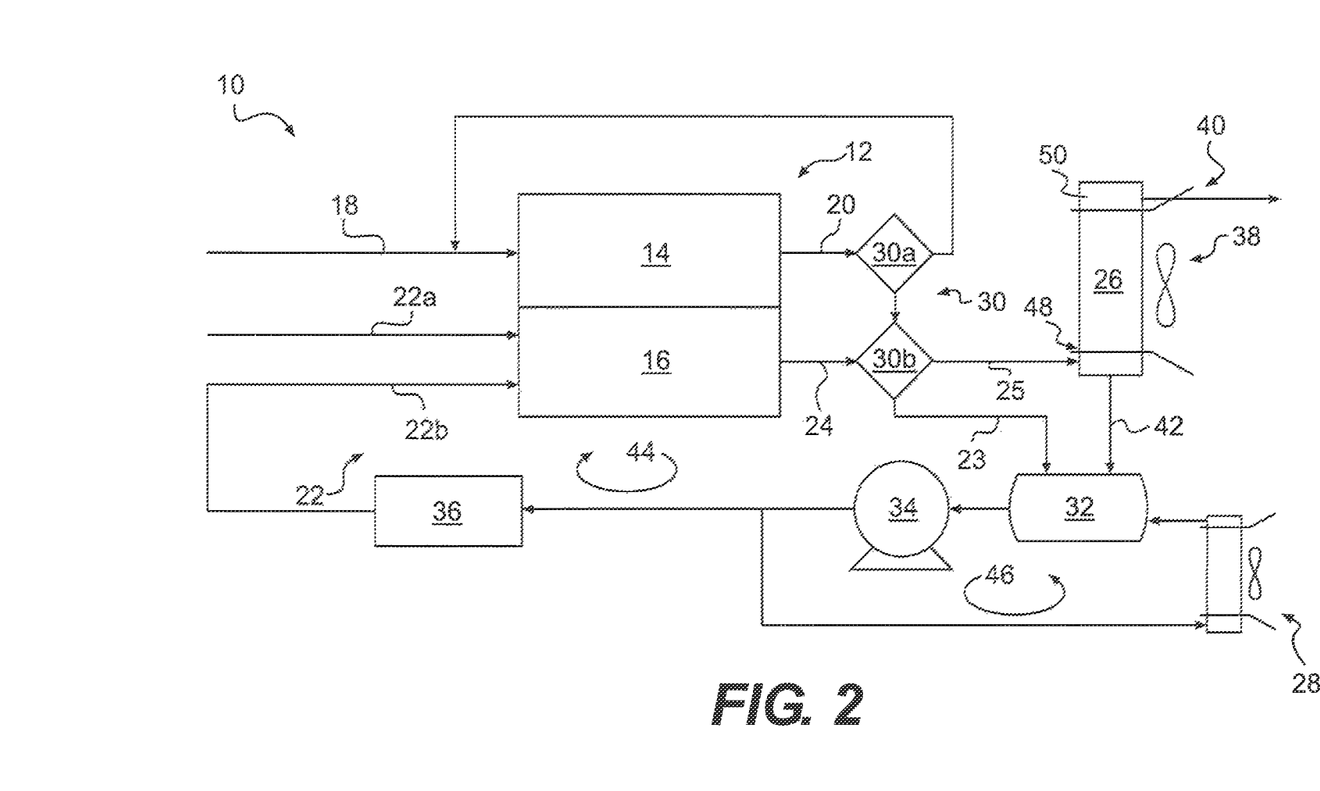
FIG. 2 provides a schematic representation of a cooling system, according to another exemplary disclosed embodiment that comprises two recirculation loops.
Figure 3:
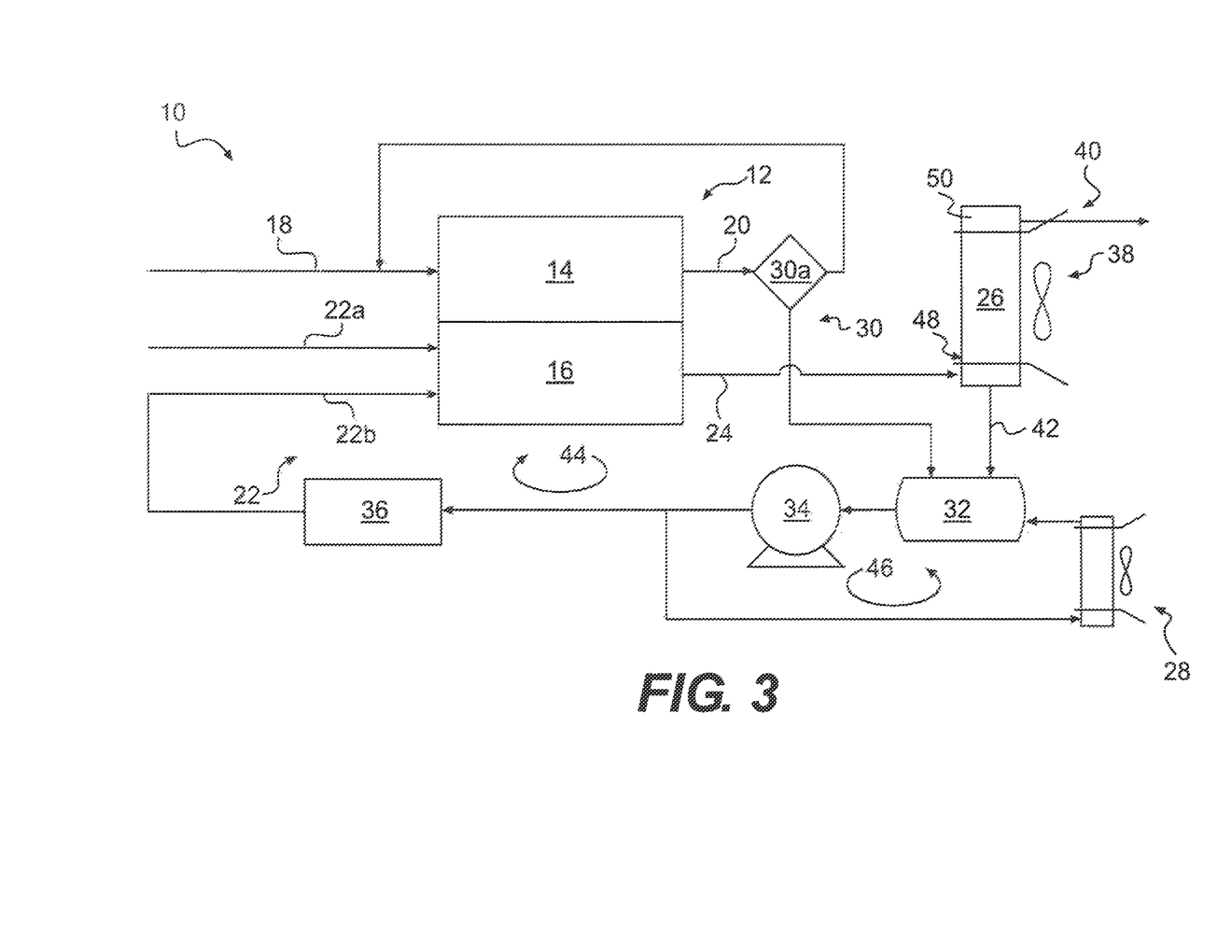
FIG. 3 provides a schematic representation of a cooling system, according to another exemplary disclosed embodiment that comprises a heat exchanger configured to separate and condense water.
Figure 4:
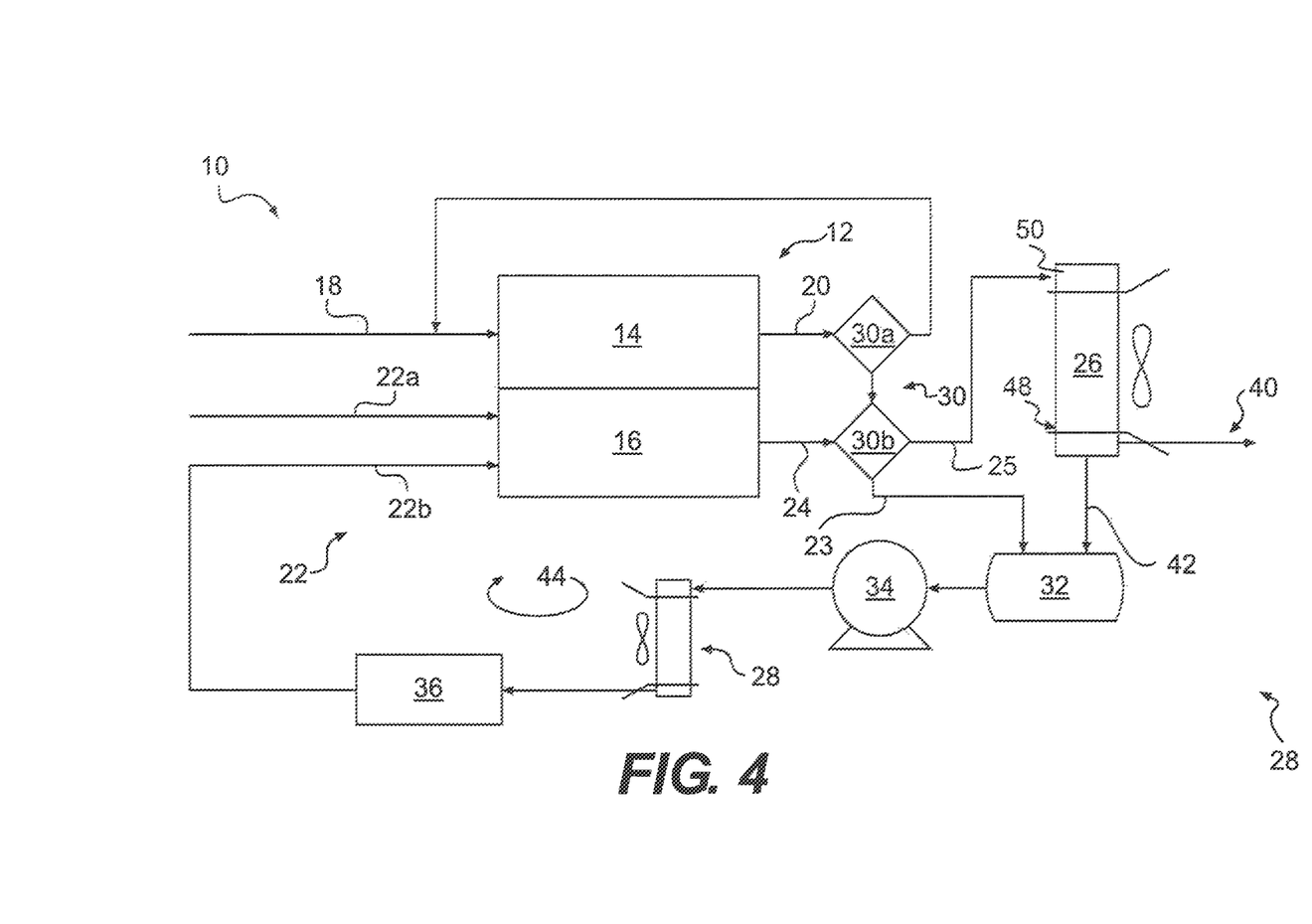
FIG. 4 provides a schematic representation of a cooling system, according to another exemplary disclosed embodiment that comprises a heat exchanger with downward fluid flow.

As shown in FIGS. 1-4, outlet passage 20 can comprise a water separator 30a configured to separate a portion of water contained within outlet passage 20. FIGS. 1, 2, and 4 show outlet passage 24 with a water separator 30b, while FIG. 3 shows outlet passage 24 lacking water separator 30b. Water separator 30a may operate to supply water to water separator 30b, as shown in FIGS. 1, 2, and 4, or storage device 32, as shown in FIG. 3. Water separator 30b may operate to supply water to storage device 32 via a first outlet passage 23. Water separator 30b may also be configured to supply a fluid to a second outlet passage 25, in some embodiments, the fluid supplied to second outlet passage 25 may comprise water in a gaseous, vapor, or droplet form.

Second outlet passage 25 may be fluidly connected to first heat exchanger 26 and configured to provide first heat exchanger 26 with a fluid. The fluid may be predominantly gas as water may have been generally removed from the fluid by water separator 30b. At least some of the water remaining in the fluid may be condensed or separated by first heat exchanger 26. Water retained by first heat exchanger 26 can be supplied to storage device 32 and recirculated through cooling system 10 via a recirculation loop 44. Water flowing through recirculation loop 44 may be cooled by second heat exchanger 28 before returning to fuel cell 12. As explained below, first heat exchanger 26 can be operated generally independently of second heat exchanger 28 to improve the overall operation and efficiency of cooling system 10.

Heat exchanger 26 can comprise one or more components configured to control a temperature of a fluid entering, within, or exiting heat exchanger 26. For example, heat exchanger 26 can comprise one or more fans 38 configured to control the temperature of a fluid passing into an exhaust passage 40. Specifically, heat exchanger 26 can comprise two cooling fans (see FIG. 7A).

By controlling fluid temperature, a rate of water condensation can be selectively controlled. Further, the amount of water within cooling system 10 can be adjusted by supplying the water retained within heat exchanger 26 to cooling system 10. Over time this water balance can be maintained within a desired range so that the total amount of water within cooling system 10 is generally constant. Such "water neutrality" means that cooling system 10 can operate with little or no water being supplied by external sources. This can include producing water via fuel cell 12 at a rate that is about equal to the rate of water loss via exhaust passage 40. A short-term mismatch in the rates of water production and loss can be buffered by supplying excess water to storage device 32 or removing water from storage device 32.

Heat exchanger 26 can comprise one or more outlet passages 42 configured to supply water to cooling system 10. As shown in FIG. 1, storage device 32 can by supplied with water from water separator 30b via outlet passage 23 and heat exchanger 26 by outlet passage 42. Water stored within storage device 32 may be supplied to second heat exchanger 28 by pump 34. Second heat exchanger 28 may at least partially cool the water before it passes through filter 36 and into inlet passage 22b. Thus, heat exchanger 28 may control the water temperature before the water is directed back into cathode 16.

As shown in FIG. 2, according to another exemplary embodiment, cooling system 10 can comprise a second recirculation loop 46 for cooling water in recirculation loop 44. Specifically, second recirculation loop 46 can be fluidly connected to recirculation loop 44 such that at least part of the water supplied to recirculation loop 44 can be supplied to recirculation loop 46. While in recirculation loop 46, water can be cooled by second heat exchanger 28 as described above, it is also understood that recirculation loop 46 may or may not comprise storage device 32, pump 34, or other device of cooling system 10.

FIG. 3 provides a schematic representation of cooling system 10, according to another exemplary embodiment, wherein outlet passage 24 from fuel cell 12 is in direct fluid communication with first heat exchanger 26. In this configuration, fluid output from cathode 16 is supplied directly to first heat exchanger 26 without passing through a water separator. First heat exchanger 26 can thus function as a water separator to separate water from fluid output by cathode 16. Water output by water separator 30a can be directly supplied to storage device 32. Such a configuration could also be provided with other embodiments of cooling system 10 described herein.

FIG. 4 provides a schematic representation of cooling system 10, according to another exemplary embodiment, wherein first heat exchanger 26 comprises a downward flow path. As explained below, first heat exchanger 26 can be configured to operate with an upward flow path or a downward flow path.

In an upflow design, for example as shown in FIGS. 1-3, fluid supplied from outlet passage 24 or water separator 30b can enter a lower manifold 48 located in a lower region of first heat exchanger 26. The fluid may then flow through first heat exchanger 26 in a general upward direction to an upper manifold 50 located in an upper region of first heat exchanger 26. This upward flow path can allow water condensing within first heat exchanger 26 to flow downwards due to gravity, against the upflow of the fluid. The condensed water can then drain out of lower manifold 48 and into storage device 32 via outlet passage 42.

In a downflow design, for example as shown in FIG. 4, fluid from fuel cell 12 can enter first heat exchanger 26 via upper manifold 50. The fluid may then flow in a general downward direction to lower manifold 48 and exit first heat exchanger 26 via exhaust passage 40. Water condensed in first heat exchanger 26 can also flow generally downwards and may drain out of lower manifold 48 via outlet passage 42.

As previously discussed, cooling system 10 may offer greater design flexibility than traditional cooling systems. Cooling system 10 may comprise less components, simplified plumbing, or occupy less space than traditional systems. In operation, cooling system 10 may also provide one or more other advantages over traditional systems, such as independent control of water temperature and water balance.

Further, cooling system 10 may permit adjusting the split of total heat load between heat exchangers 26 and 28 to improve cooling performance or operating range.

For situations when the water balance of cooling system 10 is generally constant, the total heat rejected by cooling system 10 can be relatively constant over a range of operating conditions of fuel cell 12. In these situations, cooling system 10 can be configured to split the total heat rejection required to cool fuel cell 12 between heat exchangers 26 and 28. This split can be controlled by adjusting an operating parameter of fuel cell 12 or cooling system 10, such as, for example, air stoichiometry, water inlet temperature of cathode 16, or flow rate of cooling water 22b.

Figure 5:
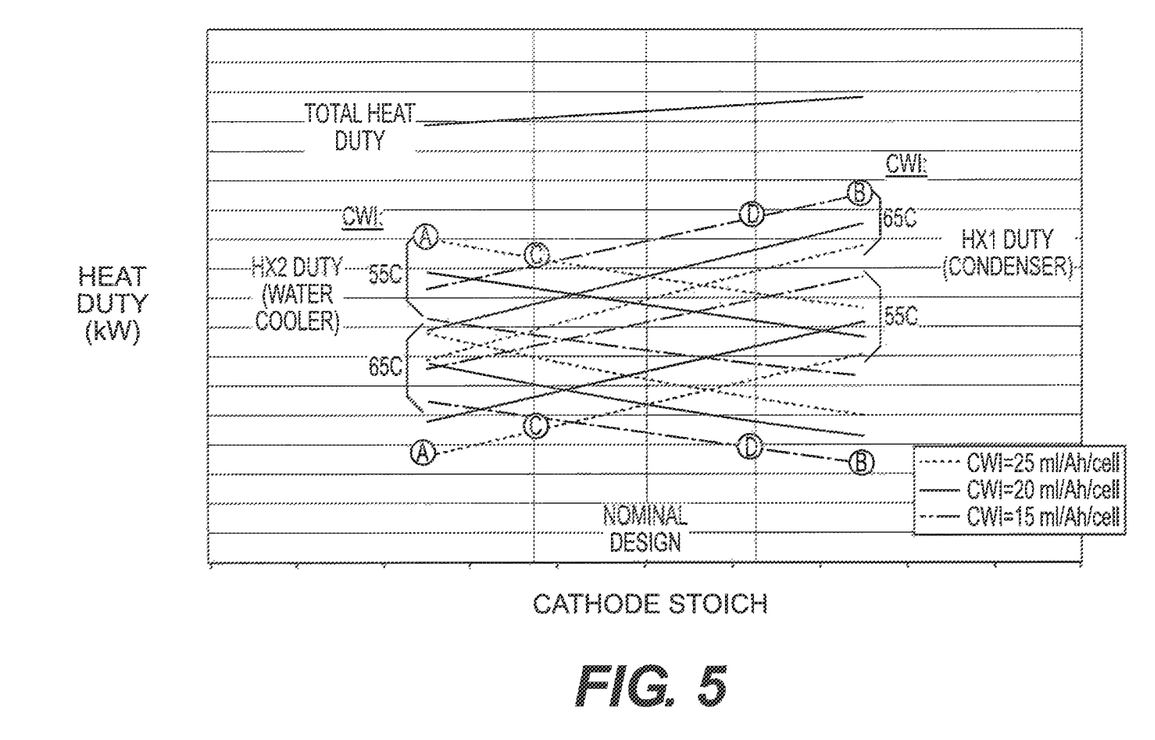
FIG. 5 provides a chart of heat duty provided by the heat exchangers, according to an exemplary disclosed embodiment.

For example, FIG. 5 shows operating parameter options for a fuel cell system requiring approximately 15 kW of total heat rejection to achieve a positive water balance of about 0.4 g/s. By changing the operating parameters as indicated in Table 1 (air stoichiometry about 1.5 to about 2.5, water temperature about 55 to about 65° C., water flow rate about 15 to about 25 ml/hr/Amp/cell), the heat duty split between first heat exchanger 26 (HX1) and second heat exchanger 28 (HX2) can range from about 25%/about 75% to about 78%/about 22%.

TABLE 1

Example Fuel Cell Operating Parameter Options

| Label | Air Stoi-chiometry | Water Flow Rate (g/s) | Water Temp (° C.) | Total Heat Duty (kw) | HX1 Duty (kW) | HX2 Duty (kW) | HX1 Duty (%) | HX2 Duty (%) |
|---|---|---|---|---|---|---|---|---|
| A | ~1.5 | ~25 | ~55 | ~14.8 | ~3.7 | ~11.1 | ~25 | ~75 |
| B | ~2.5 | ~15 | ~65 | ~15.8 | ~12.4 | ~3.4 | ~78 | ~22 |

Cooling system 10 can operate using a more restrictive or a less restrictive range of operating conditions by limiting one or more operating parameters. For example, as shown in FIG. 5, limiting the air stoichiometry to about 1.75 to about 2.25 (points C&D), instead of about 1.50 to about 2.50 (points A & B), while maintaining the same range of water flow and temperature may reduce a maximum required load on first heat exchanger 26 from about 12.4 to about 11.7 kW and on second heat exchanger 28 from about 11.1 to about 10.3 kW. Further limiting water flow and temperature may further reduce operational requirements for one or both heat exchangers 26 and 28.

Figure 6:
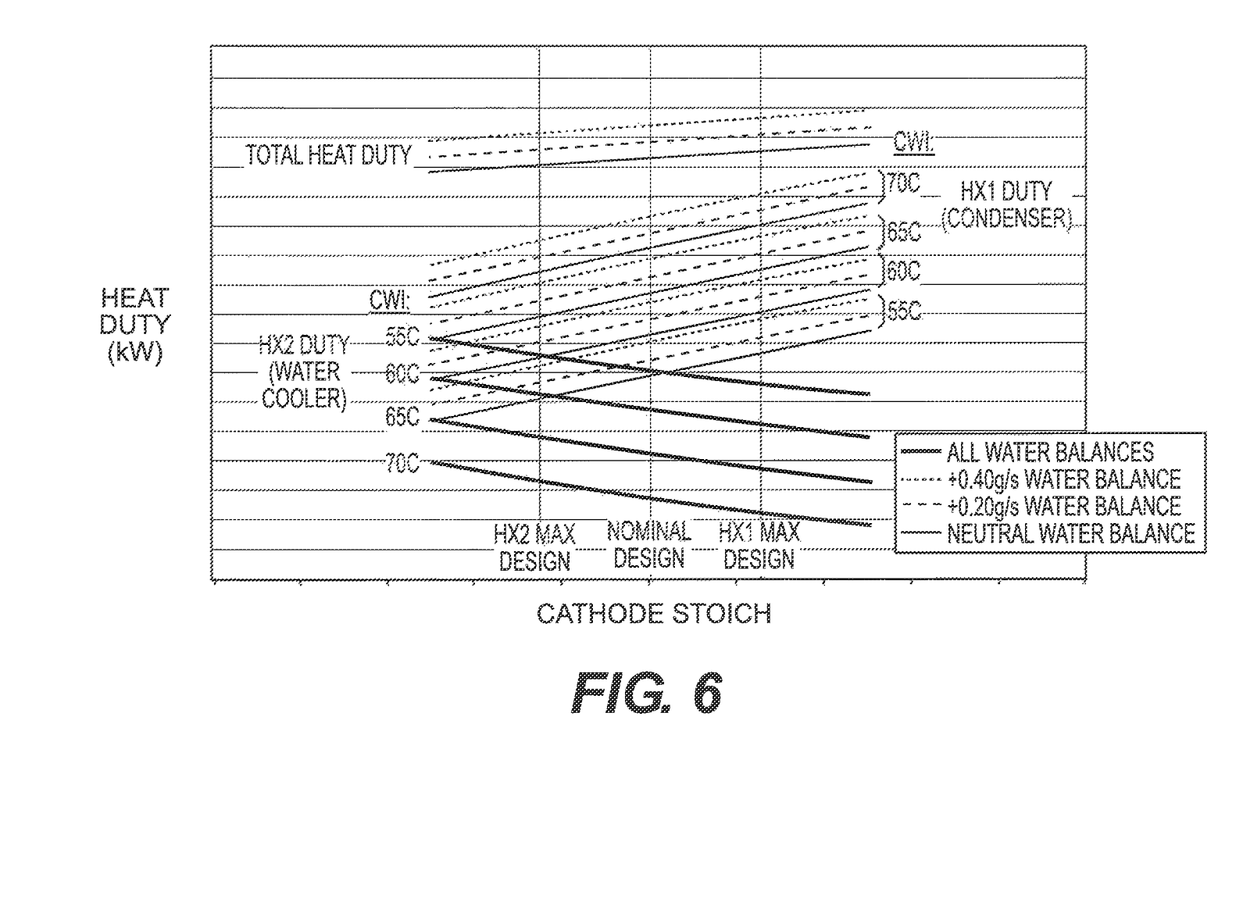
FIG. 6 provides a chart of water balance and heat duty provided by the heat exchangers, according to another exemplary disclosed embodiment.

Cooling system 10 can also be operated to control a water balance within a desired range. For example, by increasing the total heat duty rejected through heat exchangers 26 and 28, more water can be condensed by first heat exchanger 26. A positive water balance can be created whereby more water is provided by first heat exchanger 26 such that the total amount of water contained in cooling system 10 increases. FIG. 6 shows how the heat duty rejected through heat exchangers 26 and 28 can be adjusted to provide a positive or neutral water balance.

In some instances, lowering the total heat duty can create a neutral or negative water balance. For example, first heat exchanger 26 can provide a generally neutral water balance by condensing water or controlling a temperature of fluids passing through exhaust passage 40 such that the rate of water exiting cooling system 10 is about equal to the rate of water produced in the fuel reaction between hydrogen and oxygen. If the total amount of water in cooling system 10 exceeds a desired level, first heat exchanger 26 can operate to remove more water from cooling system 10 via exhaust passage 40 than is produced in the fuel cell reaction. This feedback control can be used to maintain a desired quantity of water in cooling system 10. Specifically, a desired level of water in storage device 32 can be maintained by controlling the amount of water leaving cooling system 10 via exhaust passage 40.

In some embodiments, the heat duty of first heat exchanger 26 can remain generally constant for a fixed set of operating parameters. With a generally constant heat duty of second heat exchanger 28, the water balance can be adjusted by changing the heat duty of first heat exchanger 26. For example, by changing a fan speed of first heat exchanger 26 and thus changing the temperature and water vapor content of fluid flowing through exhaust passage 40. Similarly, for a fixed heat duty of first heat exchanger 26, the water balance can be adjusted by changing the cathode air stoichiometry.

In situations where the heat duty balance requires further manipulation, the operating parameters can be shifted to improve the water balance. For example, if cooling system 10 operates in a hot environment and is unable to condense enough water, an operating parameter could be adjusted to shift more of the heat duty to second heat exchanger 28. This shift in heat duty may lessen the cooling required by first heat exchanger 26 and improve the ability of first heat exchanger 26 to maintain the water balance. If cooling system 10 operates in a cold environment and condenses too much water, the rate of condensation can be reduced by adjusting an operating parameter to shift heat duty from second heat exchanger 28 to first heat exchanger 26. This shift may keep the exhaust gas hot enough to carry excess water out of first heat exchanger 26 at exhaust passage 40.

Figure 7A:
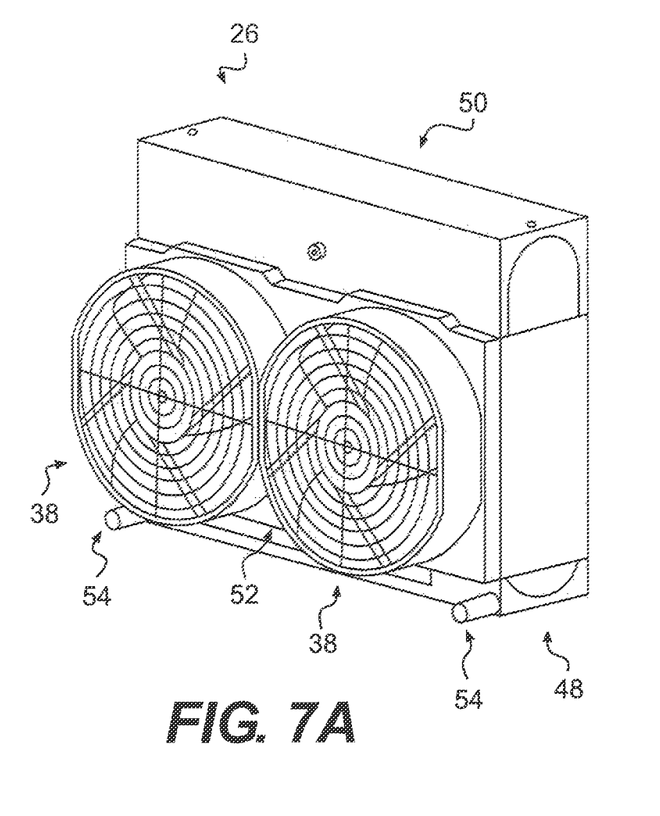
FIG. 7A provides a schematic representation of a front view of a heat exchanger, according to an exemplary disclosed embodiment.
Figure 7B:
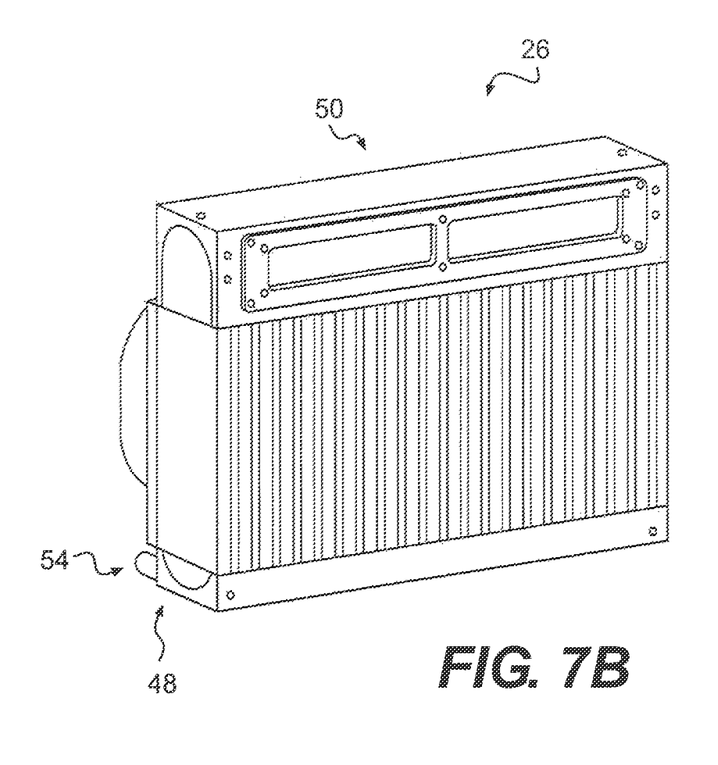
FIG. 7B provides a schematic representation of a back view of a heat exchanger, according to an exemplary disclosed embodiment.

FIGS. 7A and 7B provide schematic diagrams of first heat exchanger 26, according to an exemplary embodiment. As described above, first heat exchanger 26 can be configured to convert at least a portion of water vapor passing through first heat exchanger 26 into liquid form. For example, first heat exchanger 26 may be configured to flow an input gas stream upward against gravity. At the same time liquid water, that was either entrained with the input gas or condensed from the input gas, can flow downward due to gravity. As such, first heat exchanger 26 can function as condensing unit or a water separator.

As shown in FIGS. 7A and 7B, first heat exchanger 26 can comprise lower manifold 48 and upper manifold 50. Lower manifold 48 can comprise an inlet port 52 for receiving a flow of fluid output from fuel cell 12 (not shown). Lower manifold 48 may also comprise one or more drain ports 54 configured to provide an outlet for water retained by first heat exchanger 26. In some embodiments, drain ports 54 can be located toward opposite ends of lower manifold 48 to provide efficient water drainage when "sloshing" may push water toward either side of lower manifold 48. Such sloshing may occur due to motion of a vehicle using cooling system 10.

It is also contemplated that first heat exchanger 26 may operate without drain port 54. For example, an inlet passage (not shown) supplying fluid from water separator 30b may be angled upward toward drain port 54. The upward-angled inlet passage may also be sized to keep gas velocities low, as described below. Such an inlet passage may permit at least some water trapped by first heat exchanger 26 to drain back into water separator 30b.

Figure 8A:
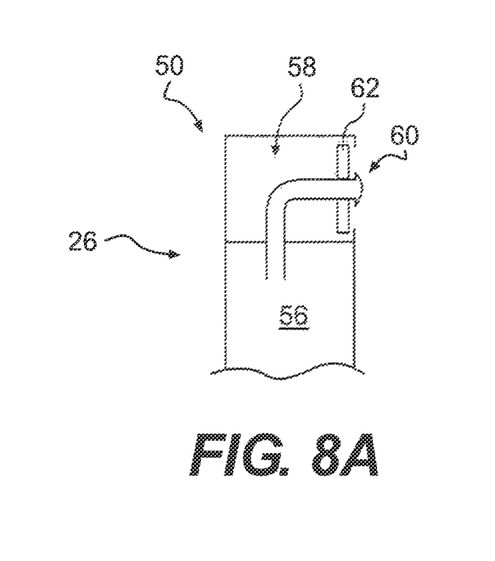
FIG. 8A provides a schematic representation of a cut-away view of part of a heat exchanger, according to an exemplary disclosed embodiment.
Figure 8B:
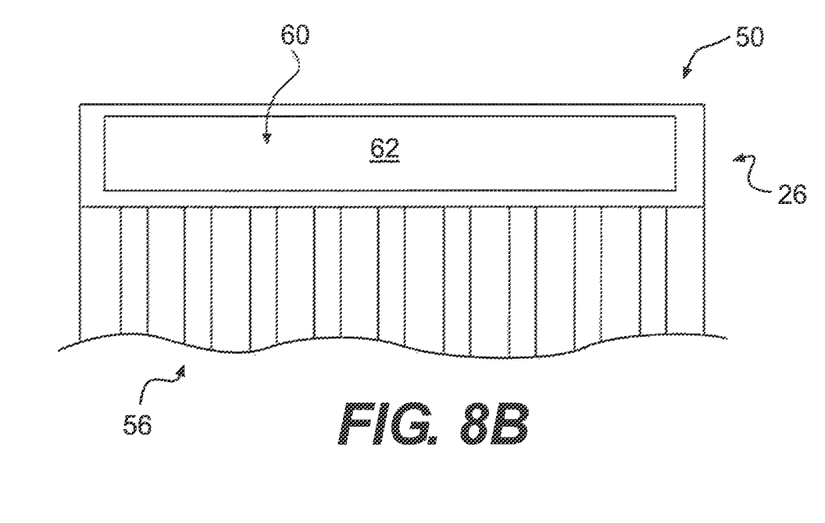
FIG. 8B provides a schematic representation of a back view of part of a heat exchanger, according to an exemplary disclosed embodiment.

As shown in FIGS. 8A and 8B, heat exchanger 26 can comprise one or more channels 56 configured to direct fluid through heat exchanger 26. In some embodiments, channels 56 can be generally vertical and may extend from lower manifold 48 to upper manifold 50. The configuration of channels 56 can permit fluid to flow generally upward from lower manifold 48 to upper manifold 50. Channels 56 can also be configured to permit fluid to flow generally downward, as described above for FIG. 4.

Channels 56 may be configured to collect water or allow water to drain out of first heat exchanger 26. For example, one or more channels 56 may be sized to allow liquid water to run downward due to gravity while fluid flows upward through channel 56. To achieve this result, the velocity of the fluid in channel 56 may be kept sufficiently low to reduce drag forces so that they are insufficient to push water upward with the fluid flow. In particular, channels 56 may be sized to provide enough total cross-sectional area (number of channels×cross sectional area of each channel) to limit the fluid velocity to a sufficiently low level to allow water drainage. Channels 56 may also have dimensions that are large enough to generally limit water surface tension that may hold water in place even with low fluid velocity. For example, channel 56 may have a width of about 6 mm or more. Water trapped within channels 56 may collect in lower manifold 48 and flow out of drain port 54, as shown in FIGS. 7A and 7B.

In some embodiments, heat exchanger 26 can comprise one or more generally parallel channels 56 directed generally vertically. The parallel channels 56 can each be fluidly connected to upper manifold 50. Upper manifold 50 can comprise a lumen 58 fluidly connected to one or more channels 56 and configured to direct a flow of fluid to an exhaust port 60, as shown in FIG. 8A.

Under some operating conditions, liquid water may be present in a flow of fluid within upper manifold 50. One or more features of heat exchanger 26 can be configured to generally limit liquid water flowing out of exhaust port 60. For example, exhaust port 60 may be sufficiently large in cross-sectional area to generally maintain a low gas velocity. In another example, exhaust port 60 may comprise a filter assembly 62 that may filter the flow of water through port 60.

Filter assembly 62 may be configured to allow exhaust fluid to exit cooling system 10 via first heat exchanger 26. Filter assembly 62 may also be configured to limit the passage of water out of first heat exchanger 26 or limit entry of external dirt or debris into first heat exchanger 26. In addition, filter assembly 62 may be configured to permit water that condenses or coalesces on filter assembly 62 to drain back into first heat exchanger 26.

Figures 9A, 9B, 9C:
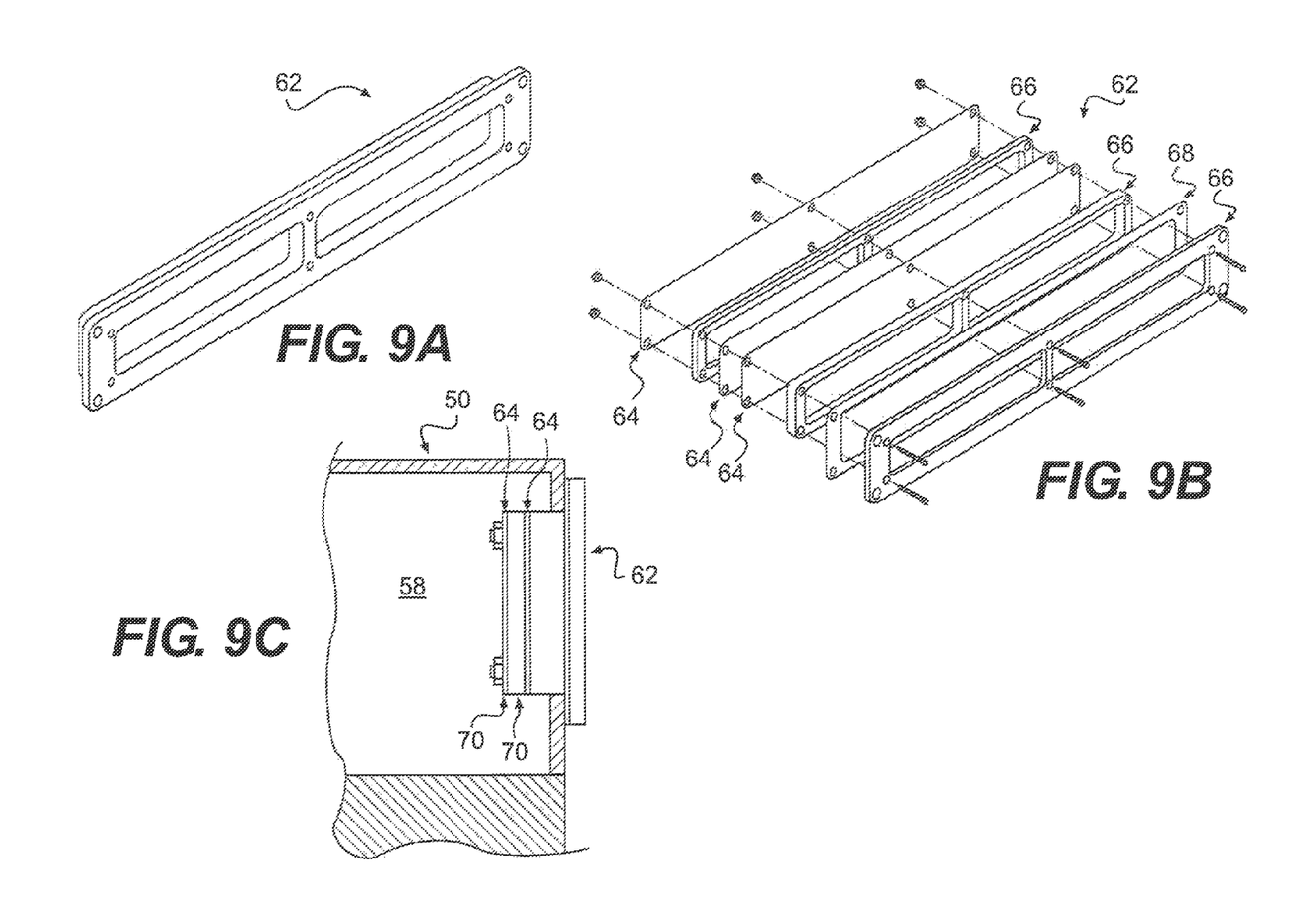
FIG. 9A provides a schematic representation of a complete filter assembly, according to an exemplary disclosed embodiment.
FIG. 9B provides a schematic representation of an exploded-view of a filter assembly, according to an exemplary disclosed embodiment.
FIG. 9C provides a schematic representation of a side-view of a filter assembly, according to an exemplary disclosed embodiment.

FIGS. 9A-C provide schematic diagrams of filter assembly 62, according to an exemplary embodiment. Filter assembly 62 can comprise one or more filter elements 64, filter frames 66, or gaskets 68 positioned in various configurations. In general, one or more filter elements 64 can permit fluid to exit cooling system 10 while at least partially limiting the passage of liquid water through filter assembly 62. Such filtering may, in some circumstances, prevent the expulsion of liquid water with the exhaust gas exiting first heat exchanger 26.

As shown in FIG. 9B, filter assembly 62 can comprise, three filter elements 64, three filter frames 66, and one gasket 68 located adjacent to each other. Filter element 64 can comprise one or more layers of porous media, such as, for example, a metallic foam, a mesh, or a felt media. One or more filter elements 64 can be held between one or more filter frames 66 or gaskets 68. In some embodiments, a first and third filter element can comprise an about 1.2 mm metallic foam and a second filter element can comprise Bekipor 60BL3 metallic filter media of other Bekipor filter media. Generally, filter element 64 should 1) enable gases including water vapor to pass through, 2) coalesce or block liquid water, 3) provide liquid water drainage, or 4) minimize infiltration of external dust or debris into heat exchanger 26. Filter element 64 can include a foam, screen, mesh, felt, wool, paper, or other porous structure. These can be formed in part from a material including metal, Teflon, glass fiber, cloth, or ceramic. In addition, filter frame 66 separating a first and second filter element 64 can have a width of about 5 mm.

In some embodiments, first heat exchanger 26 or filter assembly 62 can be configured to drain at least some water trapped by filter assembly 62 back into first heat exchanger 26. For example, the porous nature of filter element 64 may provide a path for liquid water to drain into lumen 58 due to gravity. First heat exchanger 26 or filter assembly 62 can be variously configured to permit trapped water to drip back into one or more channels 56 (not shown). To assist this water flow, filter frame 66 located between two filter elements 64 may not cover at least a part of a bottom edge 70 of filter element 64, as shown in FIG. 9C. Further, bottom edges 70 of filter elements 64 may be located above one or more channels 56 so that water from filter assembly 62 can drip in channels 56. As described above, channels 56 can be sized to enable water to flow downward to lower manifold 48.

Other embodiments of the present disclosure will be apparent to those skilled in the art from consideration of the specification and practice of the concepts disclosed herein. For example, first heat exchanger 26 may be used with various fuel cells, such as, for example, a cooling cell style fuel cell system. Moreover, one or more functions or components of heat exchangers 26 and 28 may be combined into a single unit. It is intended that the specification and examples be considered as exemplary only, with a true scope and spirit of the present disclosure being indicated by the following claims.

What is claimed is:

1. A cooling system for use with a fuel cell, comprising:
   a first heat exchanger fluidly connected to an outlet passage of the fuel cell, wherein the first heat exchanger is configured to condense at least a portion of a fluid passing through the outlet passage of the fuel cell into liquid water;
   a second heat exchanger fluidly connected to an outlet passage of the first heat exchanger and an inlet passage of the fuel cell, wherein the second heat exchanger is configured to cool the liquid water passing into the inlet passage of the fuel cell; and
   a first water separator positioned between the outlet passage of the fuel cell and the first heat exchanger configured to separate at least a portion of a fluid passing into the water separator into water;
   wherein the outlet passage of the fuel cell and the inlet passage of the fuel cell are fluidly connected to a cathode of the fuel cell, and the inlet passage of the fuel cell is configured to supply water to the cathode.

2. The cooling system of claim 1, further comprising:
   an air inlet passage fluidly connected to the cathode and configured to supply oxygen to the cathode; and
   an anode outlet passage and an anode inlet passage fluidly connected to an anode of the fuel cell, wherein the anode outlet passage is fluidly connected to the anode inlet passage and the anode inlet passage is configured to supply hydrogen to the anode.

3. The cooling system of claim 2, wherein the anode outlet passage comprises a second water separator configured to separate at least a portion of a fluid passing into the second water separator into water.

4. The cooling system of claim 3, wherein the second water separator is fluidly connected to at least one of a cathode outlet passage, the first water separator coupled to the cathode outlet passage, and a water storage device.

5. The cooling system of claim 1, further comprising at least one of a water storage device, a pump, and a filter.

6. The cooling system of claim 1, wherein the outlet passage of the first heat exchanger is fluidly connected to a water storage device having a water outlet passage fluidly connected to the second heat exchanger.

7. The cooling system of claim 1, wherein the first heat exchanger comprises:
   an inlet port fluidly connected to the outlet passage of the fuel cell,
   an exhaust port fluidly connected to atmosphere,
   a drain port, and
   a filter assembly configured to at least partially trap water within the first heat exchanger.

8. The cooling system of claim 7, wherein the filter assembly comprises at least two filter elements and at least one frame member located between the at least two filter elements, the first heat exchanger comprises one or more channels, and wherein at least one of the at least two filter elements comprises a lower edge at least partially unobstructed by the at least one frame member and configured to drain water into the one or more channels.

9. The cooling system of claim 7, wherein the filter assembly is fluidly connected to an upper manifold of the first heat exchanger, the upper manifold being fluidly connected to a plurality of channels directed generally vertical.

10. A power system, comprising:
    a fuel cell comprising a cathode fluidly connected to an outlet passage and at least one inlet passage, wherein the at least one inlet passage is configured to supply air and at least partially recirculated water to the cathode to permit mixing of the air and at least partially recirculated water within the cathode;
    a first heat exchanger fluidly connected to the outlet passage of the fuel cell, wherein the first heat exchanger is configured to convert at least a portion of a fluid passing through the outlet passage of the fuel cell into liquid water;
    a second heat exchanger fluidly connected to an outlet passage of the first heat exchanger and the inlet passage of the fuel cell, wherein the second heat exchanger is configured to cool the liquid water passing into the inlet passage of the fuel cell; and
    a first water separator positioned between the outlet passage of the fuel cell and the first heat exchanger configured to separate at least a portion of a fluid passing into the water separator into water.

* * * * *